United States Patent
Riedmueller et al.

(10) Patent No.: US 10,429,208 B2
(45) Date of Patent: Oct. 1, 2019

(54) POSITION SENSOR DEVICE AND METHOD FOR PROVIDING A FILTERED POSITION SIGNAL

(71) Applicant: ams AG, Unterpremstaetten (AT)

(72) Inventors: Kurt Riedmueller, Unterpremstaetten (AT); Gerhard Oberhoffner, Seiersberg (AT); Dominik Ruck, Graz (AT); Stephan Michelitsch, Graz (AT)

(73) Assignee: ams AG, Unterpremstaetten (AT)

( * ) Notice: Subject to any disclaimer, the term of this patent is extended or adjusted under 35 U.S.C. 154(b) by 174 days.

(21) Appl. No.: 15/406,614

(22) Filed: Jan. 13, 2017

(65) Prior Publication Data
US 2017/0131119 A1    May 11, 2017

Related U.S. Application Data (63) Continuation of application No. PCT/EP2015/065723, filed on Jul. 9, 2015.

(30) Foreign Application Priority Data

Jul. 14, 2014 (EP) .................................. 14176945

(51) Int. Cl.
G01D 5/14 (2006.01)
G01D 3/028 (2006.01)

(52) U.S. Cl.
CPC ............. *G01D 5/145* (2013.01); *G01D 3/028* (2013.01)

(58) Field of Classification Search
CPC .......... G01D 5/14; G01D 5/142; G01D 5/145; G01D 5/147; G01D 3/028; G01R 33/06; G01R 33/07; G01R 33/077
See application file for complete search history.

(56) References Cited

U.S. PATENT DOCUMENTS

| 6,255,794 | B1 | 7/2001 | Staebler |
| 2006/0041398 | A1 | 2/2006 | Alexander et al. |
| 2006/0119348 | A1 | 6/2006 | Blossfeld |
| 2009/0190283 | A1* | 7/2009 | Hammerschmidt ........................ G01D 5/24466 361/240 |
| 2012/0139742 | A1 | 6/2012 | Doutaz et al. |

(Continued)

FOREIGN PATENT DOCUMENTS

| EP | 2835616 A1 | 2/2015 |
| WO | 2014153422 A1 | 9/2014 |

OTHER PUBLICATIONS

AS5047D, "14-bit On-Axis Magnetic Rotary Position Sensor with 11-bit Decimal & Binary Incremental Pulse Count", ams Datasheet, v. 1-02, Jun. 2014, 37 pgs.

(Continued)

*Primary Examiner* — Son T Le
(74) *Attorney, Agent, or Firm* — Fish & Richardson P.C.

(57) ABSTRACT

A position sensor device comprises at least two Hall elements (11, 12) and a signal evaluation circuit (14) that is coupled on its input side to the at least two Hall elements (11, 12) and is designed to provide a digital position signal (ANS). Moreover, the position sensor device (10) comprises a processing unit (15) comprising a loop filter (16) that is coupled on its input side to the signal evaluation unit (14). The processing unit (15) is designed to adaptively control a filter parameter of the loop filter (16) during operation.

18 Claims, 8 Drawing Sheets

(56) References Cited

U.S. PATENT DOCUMENTS

2014/0036250 A1* 2/2014 Okada .................. G01B 7/14
355/75
2016/0202089 A1 7/2016 Leoncavallo et al.

OTHER PUBLICATIONS

AD2S1205, Analog Devices, 12-Bit RDC with Reference Oscillator, 2007-2010, 20 pgs.
Ak7405, "High Speed 12-bit Angle Sensor", retrieved from <http://www.akm.com/akm/en/product/datasheet1/?partno=AK7404> on Mar. 31, 2014, 1 pg.
AS5145H, "12-Bit Programmable Magnetic Rotary Encoder", ams Datasheet, Jul. 2013, 36 pgs.
AS5147, "14-Bit On-Axis Magnetic Rotary Position Sensor with 11-bit Binary Incremental Pulse Count", ams Datasheet, v. 1-02, May 2014, 35 pgs.
AS5162, "12-Bit Magnetic Angle Position Sensor", ams Datasheet, Oct. 2012, 37 pgs.
AS5163, "12-Bit Automotive Angle Position Sensor", ams Datasheet, Oct. 2010, 37 pgs.
Staebler, Martin, "TMS320F240 DSP Solution for Obtaining Resolver Angular Position and Speed", Texas Instruments, Application Report, Feb. 2000, 23 pgs.
Smith Predictor, retrieved from <http://en.wikipedia.org/wiki/Smith_predictor>, Screen Clipping Taken Feb. 2014, 1 pg.

\* cited by examiner

POSITION SENSOR DEVICE AND METHOD FOR PROVIDING A FILTERED POSITION SIGNAL

CROSS-REFERENCE TO RELATED APPLICATION

This present application is a continuation application of International Patent Application No. PCT/EP2015/065723, filed Jul. 9, 2015, which claims priority to European Patent Application No. 14176945.5, filed Jul. 14, 2014, all of which are hereby incorporated by reference in their entirety for all purposes.

BACKGROUND OF THE INVENTION

The present application is related to a position sensor device and a method for providing a filtered position signal.

A position sensor device is designed to determine a position of a moving device. The position sensor device often comprises a Hall element, a signal evaluation circuit operating as an analog front-end and a processing unit operating as a digital back-end. The signal evaluation circuit comprises an analog-to-digital converter, abbreviated as AD converter. The moving device may comprise a magnet that generates a magnetic field that is detected by the Hall element.

The moving device is often implemented as a rotating device. A position that is to be determined is an angle of the rotating device relative to a start position. The signal evaluation circuit usually comprises a filter to reduce the influence of noise and disturbances. An analog sensor signal generated by the Hall element is repeated with a frequency that is equal to a frequency of the rotation of the moving device. Thus, the filter comprised by the signal evaluation circuit has to be realized such that a detection of the position is possible even at a high rotation frequency. The position sensor device has to operate at low and at high rotation frequencies with a high accuracy.

SUMMARY OF THE INVENTION

In an embodiment, a position sensor device comprises at least two Hall elements, a signal evaluation circuit and a processing unit. The signal evaluation circuit is coupled on its input side to the at least two Hall elements. The signal evaluation circuit is designed to provide a digital position signal. Furthermore, the processing unit comprises a loop filter that is coupled on its input side to the signal evaluation unit. The processing unit is designed to adaptively control a filter parameter of the loop filter during operation.

Advantageously, the control of the filter parameter of the loop filter is continuously performed during operation of the position sensor device and achieves an adaptation of the loop filter to different dynamic conditions. The different dynamic conditions are caused by different accelerations of a moving device with respect to the position sensor device. Thus, small total errors are achieved during acceleration and during operation with integral non-linearity errors. Such integral non-linearity errors could have an effect like an acceleration.

In an embodiment, the digital position signal is a digital signal and is a function of a position of the moving device with respect to the position sensor device. The position may be an angle or a distance or a linear dimension of the moving device with respect to the position sensor device. The acceleration may be realized as an angular or a linear acceleration.

In an embodiment, the filter parameter is controlled as a function of an acceleration signal. The acceleration signal approximately depends on the acceleration of the moving device with respect to the position sensor device. Advantageously, the acceleration signal is generated by the processing unit. For example, the loop filter may provide the acceleration signal.

The filter parameter may be changed several times during operation of the position sensor device.

In an embodiment, the loop filter comprises an integrator. The filter parameter that is adaptively controlled during operation is a time constant of the integrator. For example, a short time constant is set in case of a high acceleration and a long time constant is set in case of a low acceleration.

In an embodiment, the loop filter generates a filtered position signal and a loop difference. The processing unit generates the filter parameter as a function of the loop difference. The loop difference may be a function of the acceleration of the moving device with respect to the position sensor device by approximation. The acceleration may approximately be determined by the loop difference. The acceleration signal may be implemented by the loop difference. The filtered position signal and the loop difference are generated on-line by the loop filter. Thus, the filter parameter is controlled on-line during operation of the position sensor device in parallel to generate the filtered position signal.

In an embodiment, the processing unit comprises an auxiliary loop that is coupled on its input side to the signal evaluation unit. The auxiliary loop is connected in parallel to the loop filter to an output of the signal evaluation circuit. The auxiliary loop provides an auxiliary loop difference. The processing unit may generate the filter parameter as a function of the auxiliary loop difference. The auxiliary loop difference may be a function of the acceleration of the moving device with respect to the position sensor device by approximation. The acceleration signal may be implemented by the auxiliary loop difference. The acceleration may approximately be determined by the auxiliary loop difference.

In a further development, the processing unit generates the filter parameter as a function of the loop difference and of the auxiliary loop difference. Thus, the filter parameter of the loop filter depends on output signals of the loop filter as well as of the auxiliary loop. Consequently, the generation of the filter parameter is optimized.

Alternatively, the filter parameter is set as a function of only the loop difference provided by the loop filter or only the auxiliary loop difference provided by the auxiliary loop.

In an embodiment, the loop filter generates the filtered position signal and the loop difference. The processing unit generates the filter parameter as a function of the loop difference and/or of the auxiliary loop difference provided by the auxiliary loop being comprised by the processing unit and being coupled on its input side to the signal evaluation unit.

If the processing unit generates the filter parameter only as a function of the loop difference, the processing unit may be free from the auxiliary loop.

In an embodiment, the processing unit comprises a control unit. The control unit may comprise a finite state machine. The finite state machine generates the filter parameter. The finite state machine is coupled on its input side to the loop filter and/or the auxiliary loop. An output of the finite state machine is coupled to the integrator.

In an embodiment, the loop filter compensates a delay of a signal chain. The signal chain comprises the at least two Hall elements, the signal evaluation circuit and the processing unit. Thus, the sum of the delays produced by each element in the signal chain is compensated by the loop filter. The loop filter is configured such that the delay of the signal chain may approximately be zero.

In an embodiment, the loop filter comprises a subtracting unit, the integrator, a signal output and a delay unit. A first input of the subtracting unit is coupled to the output of the signal evaluation circuit. The integrator is coupled to an output of the subtracting unit. The signal output is coupled to an output of the integrator. The filtered position signal is provided at the signal output. The delay unit couples the signal output to a second input of the subtracting unit. The first input of the subtracting unit may be realized as a non-subtracting input and the second input of the subtracting unit may be realized as a subtracting input. A delay time generated by the delay unit is set such that the delay of the signal chain may approximately be zero.

Advantageously, the delay unit may be inserted in the feedback of the loop filter. A delay time of the delay unit may be set such that a delay of the complete signal chain of the position sensor device is approximately zero. This results in a correction of the dynamic angle error.

In an embodiment, the subtracting unit performs a modulo operation. In case the filtered position signal represents an angle information, the filtered position signal may comprise values between zero and 360 angular degree. Thus, when the moving device performs a complete turn, the filtered position signal starts again with the value zero angular degree. The processing unit may provide a further signal that is equal to the number of complete rotations of the moving device.

In an embodiment, the loop filter comprises a position integrator. The position integrator may couple an output of the integrator to the signal output.

In an embodiment, the loop filter comprises a proportional element. The proportional element and the integrator are both connected to the output of the subtracting unit. Thus, the integrator and the proportional element are arranged in parallel. Furthermore, the loop filter comprises an adder that is connected on its input side to the integrator and the proportional element. Thus, the output of the subtracting unit is coupled via the integrator to a first input of the adder and via the proportional element to a second input of the adder. The position integrator couples an output of the adder to the signal output.

In a further embodiment, the processing unit adaptively controls a time constant of the position integrator. Optionally, the time constant of the integrator and the time constant of the position integrator are both set on-line by the processing unit during operation. Thus, two filter parameters of the loop filter are adaptively controlled during operation.

Alternatively, only one filter parameter of the loop filter, namely the time constant of the integrator, is adaptively controlled during operation and the time constant of the position integrator is fixed during operation.

Alternatively, only one filter parameter of the loop filter, namely the time constant of the position integrator, is adaptively controlled during operation. In that case, the time constant of the integrator is set to a constant value for operation and is not changed during operation.

In an embodiment, the processing unit operates at more than one clock rate. For example, a clock rate of the position integrator is higher than a clock rate of the integrator. Thus, a higher resolution of the filtered position signal can be achieved.

The first and the second Hall elements, the signal evaluation circuit and the processing unit may be integrated on a single semiconductor body.

The position sensor device may be implemented as magnetic position sensor device or as rotary encoder.

In an embodiment, the position sensor device performs a filtering in the digital domain such as the angular domain by the closed loop filter. The loop filter may comprise the delay unit to compensate for additional preceding delays. The delay unit may also be named a delay filter block. The loop filter may be adaptively controlled by measuring the actual acceleration of the moving device. Advantageously, a filter bandwidth is reduced below a so-called signal frequency and, thus, a signal-to-noise ratio is improved. That means that an upper limit of the filter bandwidth of the loop filter may be below a frequency of the first and the second analog sensor signals. The position sensor device operates at high speed of the moving device without increasing a dynamic error such as a dynamic angle error. The position sensor device, especially the loop filter, adapts on-line to different dynamic conditions.

In an embodiment, a distance of the moving device to the at least two Hall elements is less than 20 mm. Alternatively, said distance is less than 10 mm. Optionally, said distance is less than 5 mm.

In an embodiment, a position sensor device comprises at least two Hall elements, a signal evaluation circuit that is coupled on its input side to the at least two Hall elements and a processing unit comprising a loop filter. The loop filter is coupled on its input side to the signal evaluation unit and is designed to compensate a delay of a signal chain.

In an embodiment, a method for providing a filtered position signal comprises generating at least two analog sensor signals by at least two Hall elements, providing a digital position signal as a function of the at least two analog sensor signals, and generating a filtered position signal by a loop filter that receives the digital position signal. A filter parameter of the loop filter is adaptively controlled during operation.

Since the filter parameter is continuously adapted during operation, a high accuracy of the filtered position signal is achieved.

BRIEF DESCRIPTION OF THE DRAWINGS

The following description of figures may further illustrate and explain exemplary embodiments. Insofar as components, circuits and method steps correspond to one another in terms of their function in different figures, the description thereof is not repeated for each of the following figures.

DETAILED DESCRIPTION

Figure 1A:
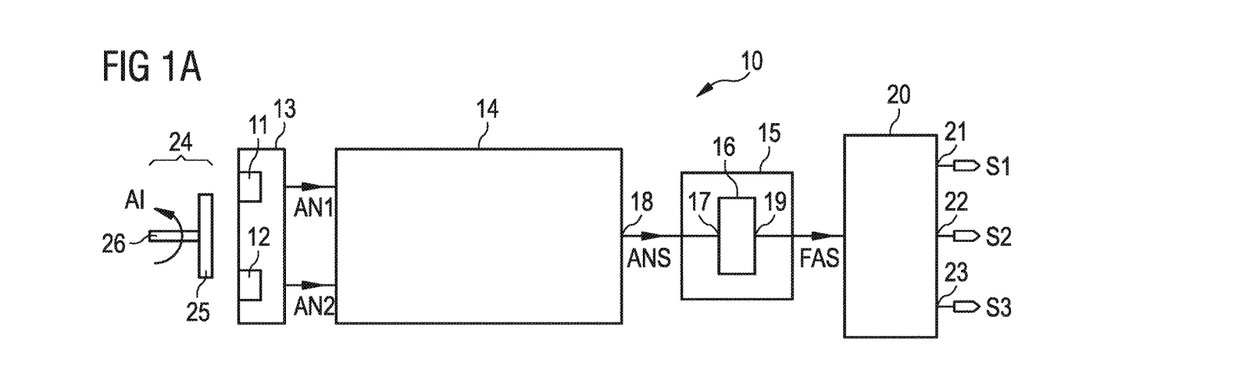
FIGS. 1A to 1D show exemplary embodiments of a position sensor device.

FIG. 1A shows an exemplary embodiment of a position sensor device 10. The position sensor device 10 comprises a first and a second Hall element 11, 12. The first and the second Hall element 11, 12 form a Hall element array 13. Moreover, the position sensor device 10 comprises a signal evaluation circuit 14. The signal evaluation circuit 14 comprises two inputs which are coupled to the first and second Hall element 11, 12. Moreover, the position sensor device 10 comprises a processing unit 15. The processing unit 15 comprises a loop filter 16. An input 17 of the loop filter 16 is coupled via an input of the processing unit 15 to an output 18 of the signal evaluation circuit 14. Moreover, the loop filter 16 comprises a signal output 19 that is coupled to an output of the processing unit 15.

In addition, the position sensor device 10 comprises an interface unit 20 that is coupled on its input side via the output of the processing unit 15 to the signal output 19 of the loop filter 16. The interface unit 20 comprises at least one device output 21, 22, 23. A device output 21 is realized as a serial peripheral interface bus, abbreviated to SPI bus. A further device output 22 is implemented as an AB quadrature incremental interface and index bus, abbreviated to ABI bus. The further device output 22 comprises three terminals, namely an incremental quadrature position output A, an incremental quadrature position output B and an index output. An additional device output 23 is designed for a commutation output mode providing UVW signals and is named as UVW bus.

A moving device 24 is located in the vicinity of the first and the second Hall element 11, 12. The moving device 24 is implemented as a rotating device. The moving device 24 comprises a magnet 25. The magnet 25 may have exactly one south pole and one north pole or may be implemented as a multi-pole magnet.

A distance of the magnet 25 to the first and the second Hall element 11, 12 is less than 20 mm. Alternatively, said distance is less than 10 mm. Optionally, said distance is less than 5 mm.

The moving device 24 performs a rotational movement around an axis 26. Thus, the moving device 24 performs an angle input AI. By the rotational movement of the magnet 25, the first and the second Hall element 11, 12 generate a first and a second analog sensor signal AN1, AN2 which are provided to the two inputs of the signal evaluation circuit 14. The signal evaluation circuit 14 performs a signal processing having the first and the second analog sensor signal AN1, AN2 as an input. The signal evaluation circuit 14 generates a digital position signal ANS at the output 18 of the signal evaluation circuit 14. The digital position signal ANS may represent an angle of the moving device to the position sensor device 10. The digital position signal ANS is a function of the first and the second analog sensor signal AN1, AN2. The signal processing within the signal evaluation circuit 14 causes a time delay between a value of the digital position signal ANS and the corresponding values of the first and the second analog sensor signal AN1, AN2.

The digital position signal ANS is provided to the input 17 of the loop filter 16. The loop filter 16 provides a filtered position signal FAS at the signal output 19. The filtered position signal FAS may represent an angle of the moving device to the position sensor device 10 after filtering the digital position signal ANS by the loop filter 16. The loop filter 16 performs a delay compensation. The loop filter 16 is implemented as an adaptive noise filter. The filtered position signal FAS is compensated in its delay time with respect to the first and the second analog sensor signal AN1, AN2. The loop filter 16 may generate a negative delay. The filtered position signal FAS is provided to the interface unit 20. The interface unit 20 generates different device output signals S1, S2, S3 as a function of the filtered position signal FAS at the three device outputs 21-23.

Advantageously, the noise filtering is performed by the loop filter 16. Thus, the signal evaluation circuit 14 implements only a reduced noise filtering. The position sensor device 10 performs adaptive noise filtering and delay compensation in the digital domain such as the angular domain.

In an alternative, not shown embodiment, the position sensor device 10 performs an off-axis rotary motion sensing. The magnet 25 may be realized as a multi-pole ring magnet.

In an alternative, not shown embodiment, the moving device 24 performs a linear movement and the position sensor device 10 determines a position of the moving device 24 on an axis relative to a start position. Thus, the digital position signal ANS and the filtered position signal FAS represent a linear and not an angular position. The magnet 25 may have exactly one north pole and one south pole or may be realized as a multi-pole magnetic strip.

Figure 1B:
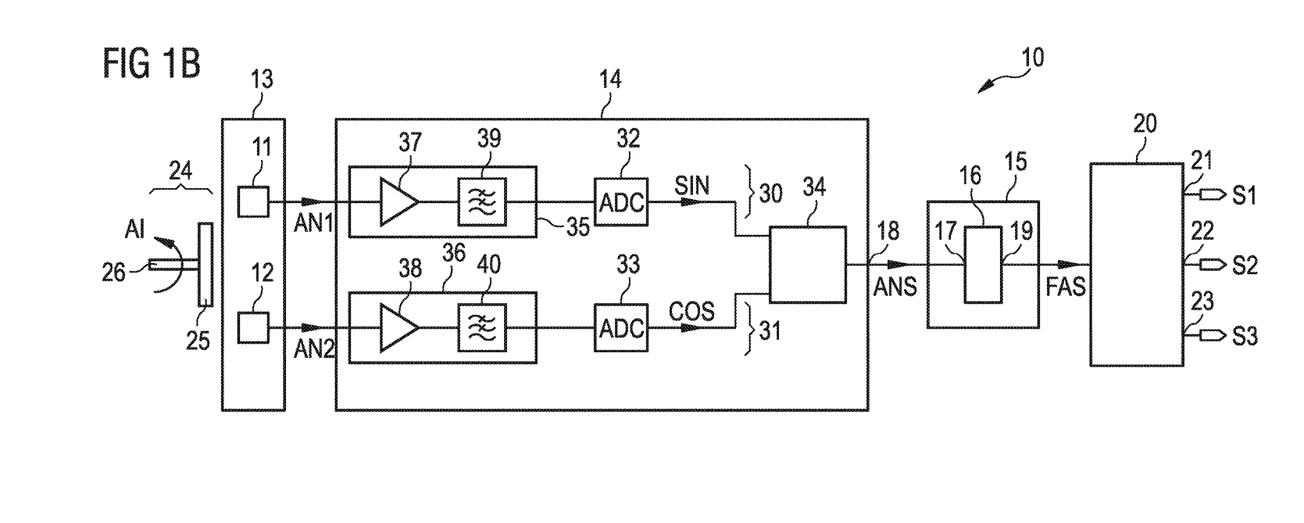

FIG. 1B shows a further exemplary embodiment of the position sensor device 10 which is a further development of the embodiment shown in FIG. 1A. The signal evaluation circuit 14 comprises a first and a second channel 30, 31. The first channel 30 is implemented as a sine-channel and the second channel 31 is realized as a cosine-channel. An input of the first channel 30 is coupled to the first Hall element 11 and an input of the second channel 31 is coupled to the second Hall element 12. The first and the second channel 30, 31 comprise a first and a second analog-to-digital converter 32, 33, respectively. An analog-to-digital converter is abbreviated as ADC.

Moreover, the signal evaluation circuit 14 comprises a position calculation unit 34 that may be realized as an angle calculation unit. The first ADC 32 is arranged between the first Hall element 11 and a first input of the position calculation unit 34. Correspondingly, the second ADC 33 is arranged between the second Hall element 12 and a second input of the position calculation unit 34.

A first amplification and filter circuit 35 couples the first Hall element 11 to an input of the first ADC 32. A second amplification and filter circuit 36 couples the second Hall element 12 to the second ADC 33. The first and the second amplification and filter circuit 35, 36 each comprise an amplifier 37, 38 and a filter 39, 40. An output of the position calculation unit 34 is connected to the output 18 of the signal processing circuit 40.

The first and the second ADC 32, 33 generate a sine and a cosine signal SIN, COS. The sine and cosine signal SIN, COS are digital signals. The noise filtering is performed partly in the analog sine-cosine domain before analog-to-digital conversion. Since the loop filter 16 is designed for noise filtering, the amplification and filter circuit 35, 36 has to filter noise in the first and the second analog sensor signal AN1, AN2 only to a small extent. The sine signal SIN is approximately proportional to the sine of the angle to be determined and the cosine signal COS is approximately proportional to the cosine of the angle to be determined.

In an alternative, not shown embodiment, the Hall element array 13 comprises more than two Hall elements. Thus, the Hall element array 13 comprises a third and a fourth Hall element. The third Hall element is connected to the first channel 30, whereas the fourth Hall element is connected to the second channel 31. Thus, the first and the third Hall element contribute to the sine signal SIN and the second and the fourth Hall element contribute to the cosine signal COS.

Figure 1C:
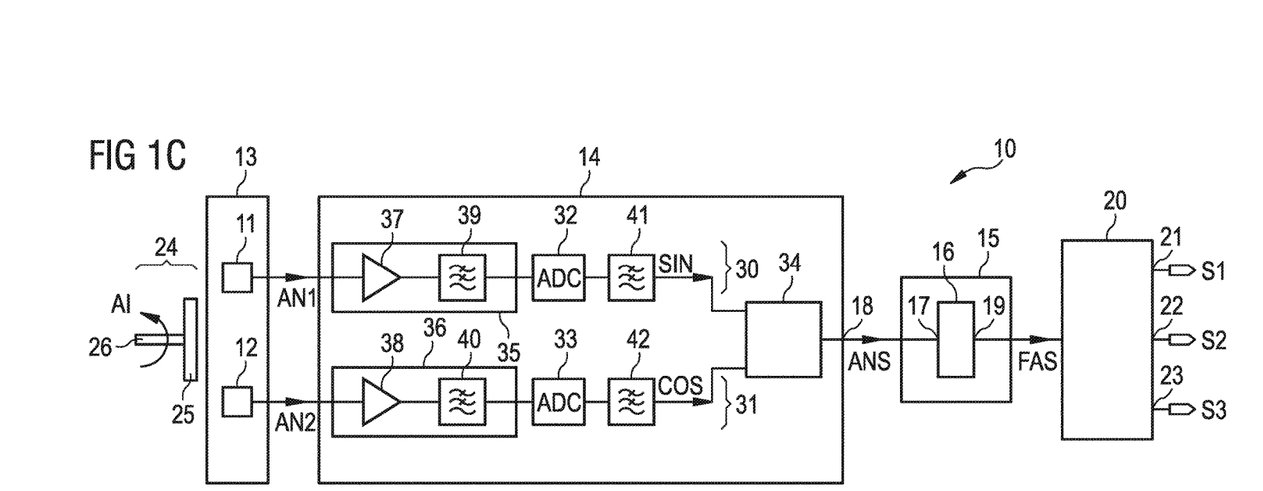

FIG. 1C shows a further exemplary embodiment of the position sensor device 10 which is a further development of the embodiments shown in FIGS. 1A and 1B. The first and the second amplification and filter circuit 35, 36 perform an amplification and an anti-aliasing filtering of the first and the second analog sensor signal AN1, AN2. Thus, the first and the second filter 39, 40 are designed for anti-aliasing filtering. Additionally, the first and the second channel 30, 31 comprise a first and a second digital noise filter 41, 42 which are arranged between the first and the second ADC 32, 33 and the position calculation unit 34.

Thus, the first and the second analog sensor signal AN1, AN2 are only filtered to avoid the aliasing effect, before they are provided to the first and the second ADC 32, 33. The noise filtering is performed partly in the digital sine-cosine domain after analog-to-digital conversion. Since the loop filter 16 removes most of the noise, the first and the second digital noise filter 41, 42 do not have to filter noise with a high efficiency. For example, the first and the second digital noise filter 41, 42 are realized as low-pass filters having a high cut-off frequency.

Figure 1D:
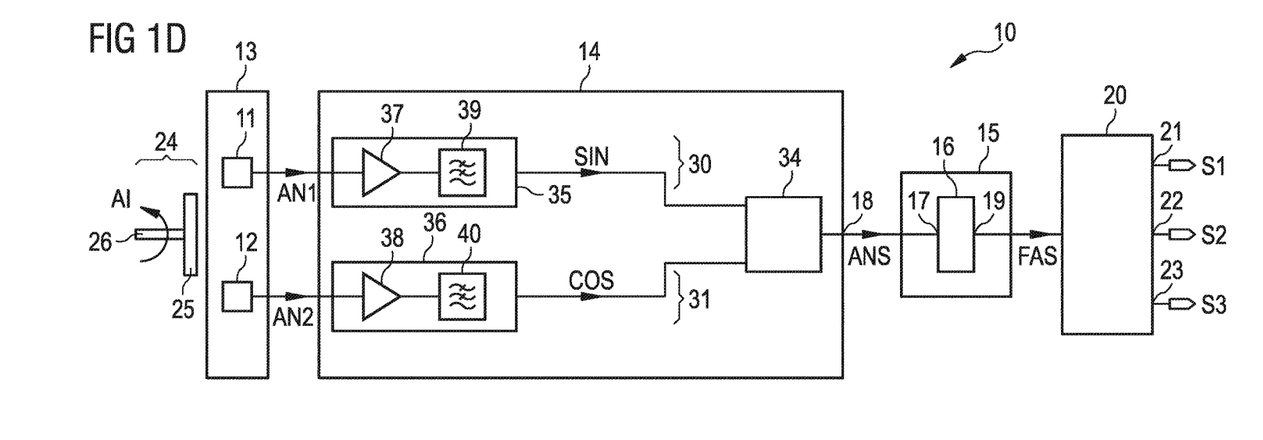

FIG. 1D shows a further exemplary embodiment of the position sensor device 10 which is a further development of the embodiments shown in FIG. 1A to 1C. An output of the first amplification and filter circuit 35 is directly connected to the first input of the position calculation unit 34. Correspondingly, an output of the second amplification and filter circuit 36 is directly connected to the second input of the position calculation unit 34. Neither the first nor the second channel 30, 31 comprises an ADC. The position calculation unit 34 is implemented for analog-to-digital conversion.

Thus, the position calculation unit 34 performs a calculation of the digital position signal ANS as a function of the sine and cosine signal SIN, COS which are analog signals. The position calculation unit 34 performs an arc tangens calculation for generating the digital position signal ANS as a function of the sine and cosine signal SIN, COS. The analog-to-digital conversion and the combination of the analog sine and cosine signal SIN, COS is performed simultaneously by the position calculation unit 34. The noise filtering is performed partly in the analog sine-cosine domain before the arctan weighted analog-to-digital conversion.

In case the moving device 24 performs a linear movement, the first and the second channel 30, 31 generate a first and a second signal SIN, COS. The position calculation unit 34 calculates the digital position signal ANS as a function of the first and second signal SIN, COS.

Figure 2A:
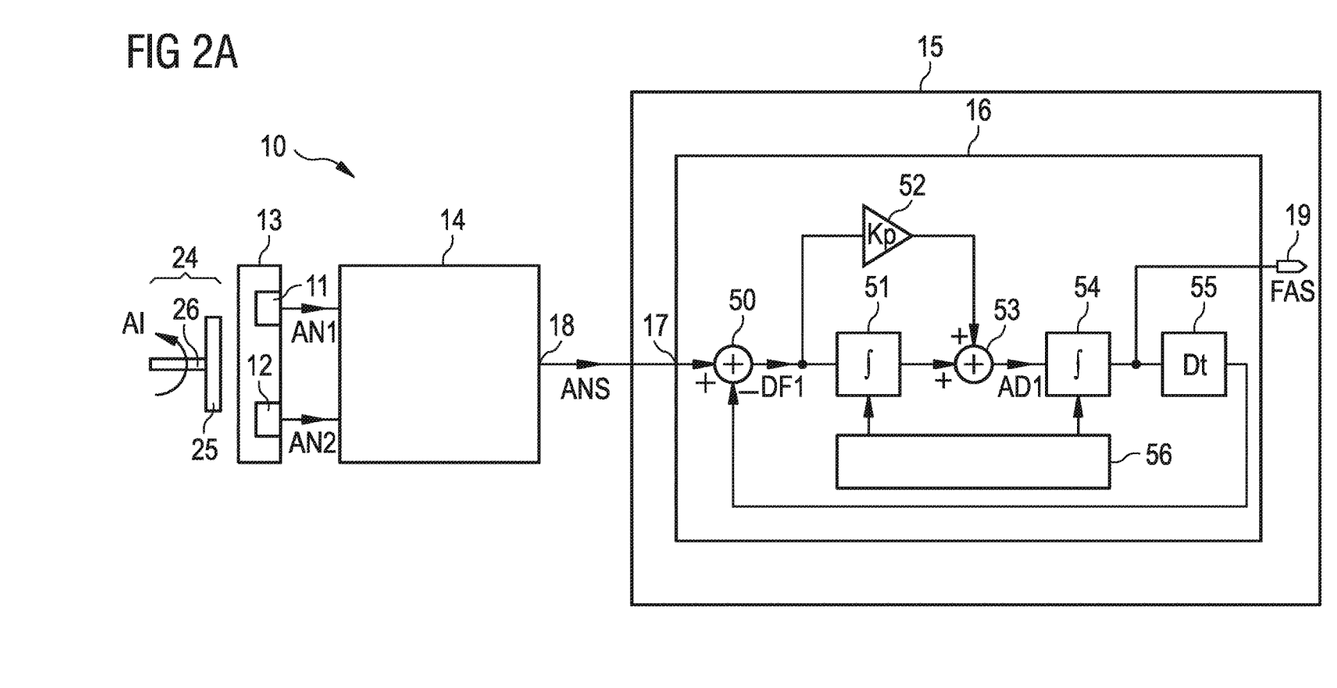
FIGS. 2A to 2C show further exemplary embodiments of the position sensor device.

FIG. 2A shows an exemplary embodiment of the position sensor device 10 which is a further development of the embodiments shown in FIG. 1A to 1D. The signal evaluation circuit 14 may be implemented as one of the embodiments of the signal evaluation circuit 14 shown in FIGS. 1A to 1D. The processing unit 15 comprises the loop filter 16 having the input 17 and the signal output 19. The loop filter 16 is designed in the form of a closed loop. The loop filter 16 comprises a subtracting unit 50, an integrator 51, a proportional element 52, an adder 53 and a position integrator 54. The integrator 51 and the proportional element 52 are connected in parallel between an output of the subtracting unit 50 and a first and a second input of the adder 53. An output of the adder 53 is coupled to the signal output 19 via the position integrator 54.

Moreover, the loop filter 16 comprises a delay unit 55 that couples the signal output 19 to a second input of the subtracting unit 50. A first input of the subtracting unit 50 is connected to the input 17 of the loop filter 16. Moreover, the processing unit 15 comprises a control unit 56 which is connected on its output side to a control input of the integrator 51 and to a control input of the position integrator 54. The control unit 56 is implemented for adaptive control. The control unit 56 controls two filter parameters of the loop filter 16 during operation.

The two filter parameters are a time constant of the integrator 51 and a time constant of the position integrator 54. The time constants are the integration times of the integrators 51, 54. The integrator 51 integrates its input signal during the time constant of the integrator 51. Correspondingly, the position integrator 54 integrates its input signal during the time constant of the position integrator 54. The control unit 56 sets the time constants of the integrator 51 and of the position integrator 54. The time constant of the integrator 51 may be equal or may be different from the time constant of the position integrator 54. The delay unit 55 delays an output signal of the delay unit 55 with a delay time Dt with respect to an input signal of the delay unit 55. The delay time Dt may be set such that a delay of the complete signal chain of the position sensor device 10 is approximately zero.

The loop filter 16 receives the digital position signal ANS and provides the filtered position signal FAS. The digital position signal ANS is provided to the first input of the subtracting unit 50. The filtered position signal FAS is applied after the delay time Dt generated by the delay unit 55 to the second input of the subtracting unit 50. The first input of the subtracting unit 50 is a non-subtracting input and the second input of the subtracting unit 50 is a subtracting input.

The subtracting unit 50 outputs a loop difference DF1 which is a function of a difference of the digital position signal ANS and the time delayed filtered position signal FAS. The loop difference DF1 is an acceleration signal. The loop difference DF1 is a function of an acceleration of the moving device 24. The subtracting unit 50 performs a modulo operation when generating the loop difference DF1. The loop difference DF1 is integrated by the integrator 51 and amplified with a factor Kp by the proportional element 52 in parallel. An output signal of the proportional element 52 and an output signal of the integrator 51 are provided to the first and the second inputs of the adder 53. An output signal AD1 of the adder 53 is integrated by the position integrator 54 that generates the filtered position signal FAS. The delay time Dt may be selected such that the filtered position signal FAS is free of a delay with respect to the first and the second analog sensor signal AN1, AN2. Alternatively, the delay time Dt may be selected such that the device output signals S1, S2, S3 are free of a delay to the first and the second analog sensor signal AN1, AN2. The position sensor device 10 may be fabricated on exactly one semiconductor body. The delay times of different circuit blocks of the position sensor device 10 may be known and, therefore, the delay time Dt may be selected with high accuracy.

In an alternative, not shown embodiment, the control unit 56 is coupled only to the integrator 51. Thus, only the time constant of the integrator 51 is controlled and changed during operation. The time constant of the position integrator 54 is constant during operation.

In an alternative, not shown embodiment, the control unit 56 is coupled only to the position integrator 54. Thus, only the time constant of the position integrator 54 is controlled and changed during operation. The time constant of the integrator 51 is constant during operation.

In an alternative, not shown embodiment, the control unit 56 is omitted. None of the filter parameters of the loop filter 16 is controlled during operation.

In an alternative, not shown embodiment, the positions of the elements in the loop filter 16 are exchanged. For example, the position integrator 54 is connected to the output of the subtracting unit 50. The integrator 51 and the proportional element 52 couple the output of the position integrator 54 to the inputs of the adder 53. The output of the adder 53 is coupled to the signal output 19 and via the delay unit 55 to the second input of the subtracting unit 50.

Figure 2B:
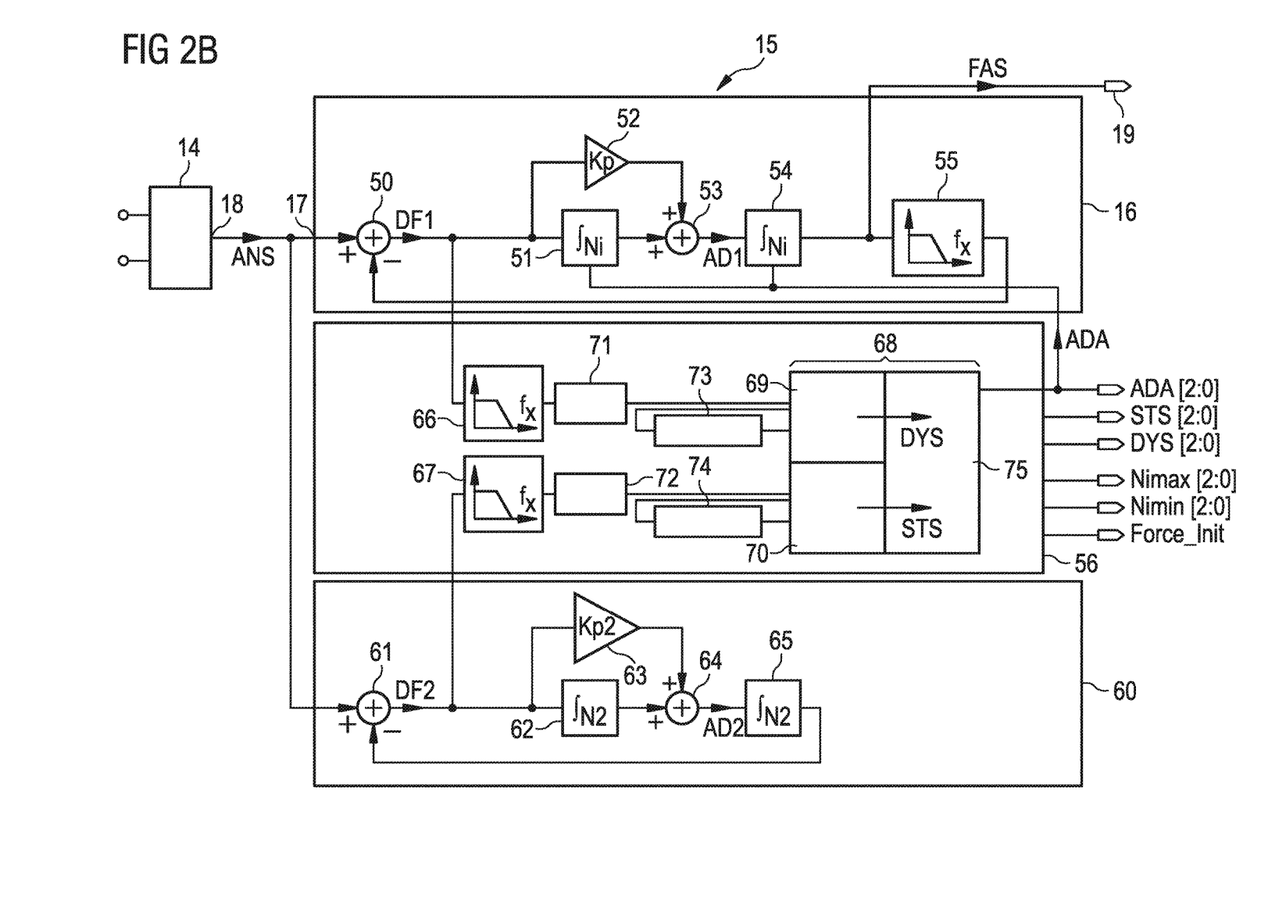

FIG. 2B shows an exemplary embodiment of the processing unit 15 which is a further development of the embodiment of the processing unit 15 shown in FIG. 2A and which can be inserted in the embodiments of the position sensor device 10 shown in FIGS. 1A to 1D and 2A. The subtracting unit 50 generates the loop difference DF1 as a function of the digital position signal ANS and of the time delayed filtered position signal FAS. The delay unit 55 is realized as a low-pass filter.

Additionally, the processing unit 15 comprises an auxiliary loop 60. The auxiliary loop 60 is connected on its input side to the output 18 of the signal evaluation circuit 14. The auxiliary loop 60 is realized such as the loop filter 16. The loop filter 16 may also be named main loop filter. However, the auxiliary loop 60 is free of a delay unit. The auxiliary loop 60 comprises an auxiliary subtracting unit 61, an auxiliary integrator 62, an auxiliary proportional element 63, an auxiliary adder 64 and an auxiliary position integrator 65. A first input of the auxiliary subtracting unit 61 is connected to the output 18 of the signal evaluation circuit 14. An output of the auxiliary subtracting unit 61 is coupled via the auxiliary integrator 62 to a first input of the auxiliary adder 64 and via the auxiliary proportional element 63 to a second input of the auxiliary adder 64. An output of the auxiliary adder 64 is coupled via the auxiliary position integrator 65 to a second input of the auxiliary subtracting unit 61.

The output of the subtracting unit 50 is connected to a first input of the control unit 56. Correspondingly, the output of the auxiliary subtracting unit 61 is connected to a second input of the control unit 56. The control unit 56 comprises a first and a second low-pass filter 66, 67 which are connected to the output of the subtracting unit 50 and to the output of the auxiliary subtracting unit 61. Moreover, the control unit 56 comprises a finite state machine 68 which is coupled on its input side to the output of the first and the second low-pass filter 66, 67. The finite state machine 68 is connected on its output side to the control terminal of the integrator 51 and to the control terminal of the position integrator 54.

The finite state machine 68 comprises a first state machine 69 which is coupled to the output of the first low-pass filter 66. Correspondingly, the finite state machine 68 comprises a second state machine 70 that is coupled to the output of the second low-pass filter 67.

A first and a second absolute value generator 71, 72 of the control unit 56 couple the output of the first low-pass filter 66 to an input of the first state machine 69 and the output of the second low-pass filter 67 to an input of the second state machine 70, respectively.

Moreover, the control unit 56 comprises a first and a second delay element 73, 74. The first delay element 73 is connected on its input and output side to the first state machine 69. Correspondingly, the second delay element 74 is connected on its input and on its output side to the second state machine 70. The first and the second delay element 73, 74 are implemented as mono-flops.

In addition, the finite state machine 68 comprises a combining unit 75. The combining unit 75 may comprise a table. The combining unit 75 is connected on its input side to the first and the second state machine 69, 70 and on its output side to the control terminal of the integrator 51 and to the control terminal of the position integrator 54.

Thus, the digital position signal ANS is provided to the first input of the auxiliary subtracting unit 61. An auxiliary loop difference DF2 is generated by the auxiliary subtracting unit 61 and integrated by the auxiliary integrator 62 as well as amplified by the auxiliary proportional element 63 with a factor Kp2. The two signals generated by the auxiliary integrator 62 and the auxiliary proportional element 63 are provided to the two inputs of the auxiliary adder 64. An auxiliary adder output signal AD2 of the auxiliary adder 64 is integrated by the auxiliary position integrator 65 and provided as an integrated signal to the second input of the auxiliary subtracting unit 61. The auxiliary subtracting unit 61 also performs a modulo operation as the subtracting unit 50. The auxiliary integrator 62 and the auxiliary position integrator 65 integrate with fixed time constants.

The loop difference DF1 and the auxiliary loop difference DF2 are low pass filtered by the first and the second low-pass filter 66, 67. The filtered loop difference DF1 and the filtered auxiliary loop difference DF2 are provided to the first and the second state machine 69, 70.

The first and the second absolute value generator 71, 72 generate the unsigned magnitude of the filtered loop difference DF1 and the filtered auxiliary loop difference DF2 before feeding them to the first and the second state machine 69, 70.

The first state machine 69 generates a dynamic signal DYS and the second state machine 70 generates a static signal STA. The dynamic signal DYS and the static signal STS are fed to the combination unit 75. A control signal ADA is generated by means of the static signal STS, the dynamic signal DYS and the table of the combination unit 75. By means of the table, a maximum of the static signal STS and of the dynamic signal DYS may be selected. A value of the control signal ADA can be calculated according to the equation:

$$ADA=\text{Maximum}(STS;DYS),$$

wherein STS is a value of the static signal and DYS is a value of the dynamic signal. The control signal ADA of the finite state machine 68 is provided to the control terminals of the integrator 51 and of the position integrator 54.

The loop difference DF1 and the auxiliary loop difference DF2 both depend on an acceleration that means an angular acceleration or a linear acceleration of the moving device 24. Thus, the loop difference DF1 and the auxiliary loop difference DF2 are acceleration signals. The auxiliary loop difference DF2 represents the acceleration with a higher accuracy than the loop difference DF1. However, the loop difference DF1 is generated with a smaller delay in comparison to the auxiliary loop difference DF2. Thus, both signals DF1, DF2 are fed to the control unit 56 and are combined by the control unit 56 to set the time constant of the integrator 51 and the time constant of the position integrator 54.

An error of the filtered position signal FAS caused by an acceleration of the moving device 24 can be kept low. The adaptation of the time constants of the integrator 51 and of the position integrator 54 results in a balance between a noise error and an error caused by the acceleration. In case of a high acceleration, the time constants are kept low, resulting in an increased noise error. In case of a low acceleration, the time constants are kept long resulting in a low noise error.

When the moving device 24 changes the direction of rotation, the angular velocity has a value zero at a certain point in time. Despite the value zero of the angular velocity, the value of the angular acceleration may be high. The first and the second delay element 73, 74 have the effect that the time constants are determined with a high accuracy also for the situation in which the direction of the rotational movement is changed.

The elements of the processing unit 15 shown in FIGS. 2A and 2B are fabricated as hardware elements using digital gates and state machines. Thus, the processing unit 15 performs the delay compensation without using a software code. Alternatively, the processing unit 15 is implemented as a micro-processor or a micro-controller and the elements shown in FIGS. 2A and 2B are realized using a software code stored in a not-shown memory.

The processing unit 15 shown in FIG. 2B is split into three main parts: The loop filter 16, the auxiliary loop 60 and the adaptive control unit 56. The loop filter 16 can be seen as a proportional-integral controller and a plant. The plant is the position integrator 54 which generates the position output in the form of the filtered position signal FAS. The input signal of the position integrator 54 is proportional to the speed. The proportional-integral controller generates the required speed input signal so that the filtered position signal FAS follows the filter inputs. Due to the delay unit 55 in the closed loop feedback, the filtered position signal FAS will be timely ahead of the input signal accordingly. This realizes the delay compensation for a preceding system delay, if the feedback delay generated by the delay unit 55 is matched to the preceding delay.

The controller is built as proportional-integral circuit to obtain stability of the closed loop filter 16. The delay of the loop filter 16 compensates itself due to the closed loop principle. The error signal that is also named loop difference DF1 at the subtracting unit 50 is proportional to the acceleration and can be used to adapt the time constants of both the proportional-integral controller 51, 52 and the position integrator 54.

The auxiliary loop 60 is used to measure the acceleration and determine the required adaption setting for the loop filter 16. The auxiliary loop 60 can be simplified and does not need a delay in the feedback path. This second loop 60 improves the stability of the processing unit 15, because the loop difference DF1 of the loop filter 16 may be influenced by the adaptive time constant variation. When the adaption is additionally controlled by the auxiliary loop 60, stability issues are reduced.

The adaptive control achieves a low total error during dynamic speed changes. It separates the acceleration-effect, induced by the system integral non-linearity error, abbreviated as INL error, and keeps the stability of the system during all kind of angular movement situations. The adaptive control unit 56 is able to response very fast to dynamic changes. This is provided by monitoring the loop difference DF1 from the loop filter 16 too. A good trade-off is found between noise, dynamic error such as a dynamic angle error and INL influence. A relation between noise and time constant as well as the resulting dynamic error for different acceleration conditions exists. The speed induced dynamic error is compensated to zero.

In an alternative, not shown embodiment, the first and the second delay element 73, 74 are connected on their input sides to the output of the first and the second absolute value generator 71, 72. On the output side, the first and the second delay element 73, 74 are connected to the first and the second state machines 69, 70.

In an alternative, not shown embodiment, the finite state machine 68 generates two control signals. The control signal ADA is provided to the control terminal of the integrator 51 and a further control signal is applied to the control terminal of the position integrator 54.

In an alternative, not shown embodiment, the control unit 56 is connected on its output side only to the control terminal of the integrator 51.

In an alternative, not shown embodiment, the output of the control unit 56 is only connected to the control terminal of the position integrator 54.

Figure 2C:
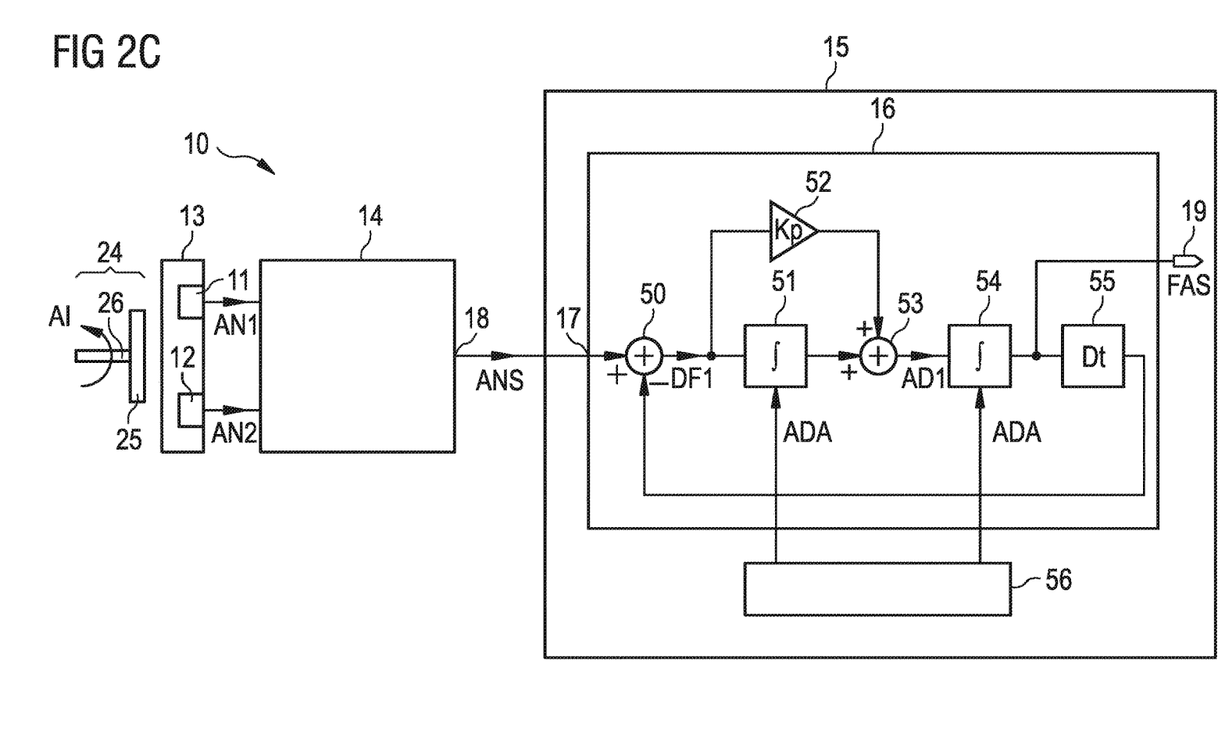

FIG. 2C shows an exemplary embodiment of the position sensor device 10 which is a further development of the embodiments shown in FIGS. 1A to 1D, 2A and 2B. The processing unit 15 comprises the loop filter 16 and the control unit 56. The control unit 56 is connected on its output side to the loop filter 16. Thus, the control unit 56 provides the control signal ADA to the control input of the integrator 51 and to the control input of the position integrator 54. As shown in FIG. 2C, the loop filter 16 and the control unit 56 are realized as separate units.

Alternatively, as shown in FIG. 2A, the control unit 56 may be incorporated by the loop filter 16.

FIG. 3A through FIG. 3F show exemplary embodiments of simulation results of the position sensor device 10 with a processing unit 15 as shown in FIG. 2B. The period between two samples is 0.5 μs, which corresponds to 2000 samples in 1 ms in FIGS. 3A to 3F.

Figure 3A:
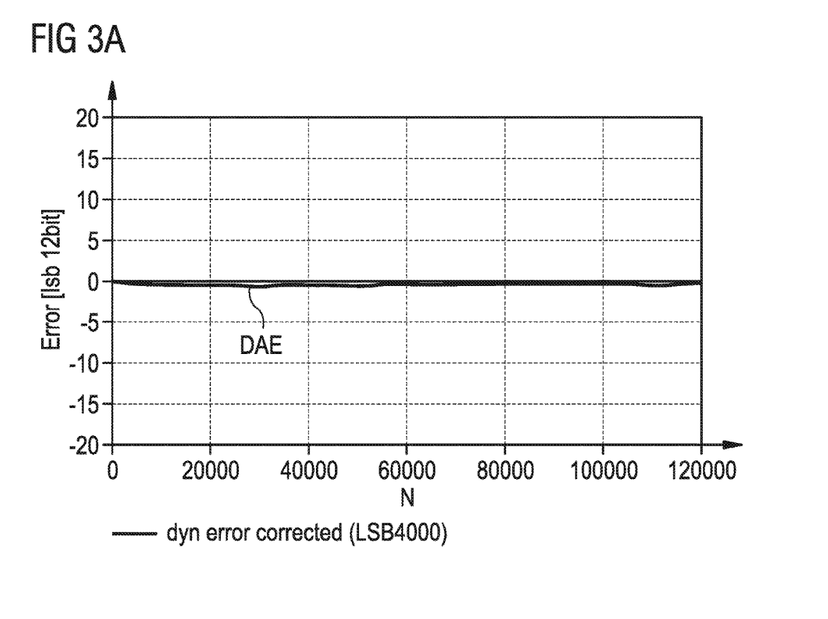
FIGS. 3A to 3F show exemplary embodiments of simulation results of a position sensor device.

In FIG. 3A, an error of the filtered position signal FAS is illustrated as a function of a number N of samples. The rotation of the moving device 24 is performed at a constant speed with 10000 rotations per minute, abbreviated as rpm. The curve shows the dynamic angle error, abbreviated as DAE, after correction. As shown in FIG. 3A, no DAE occurs and the noise is very low.

Figure 3B:
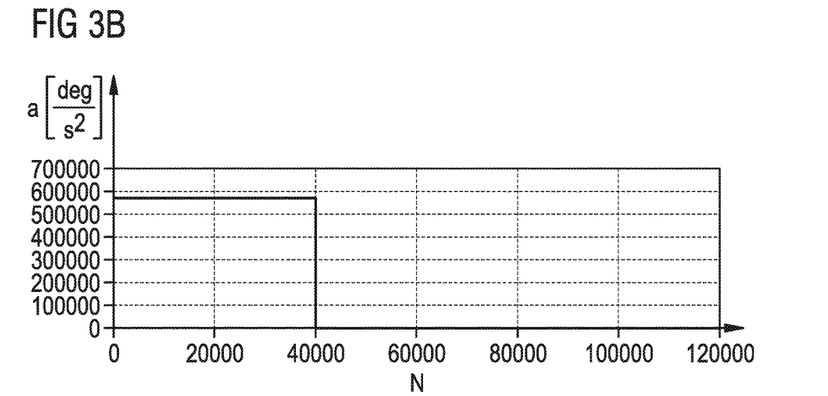
Figure 3C:
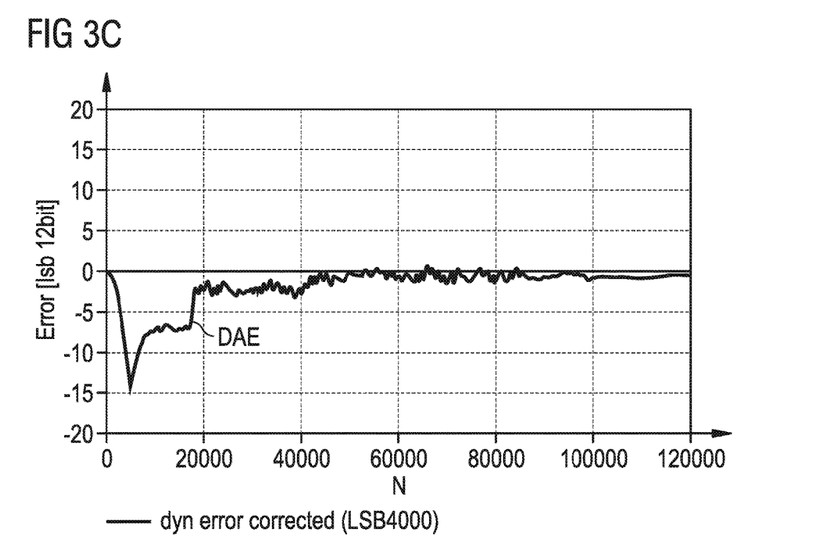
Figure 3D:
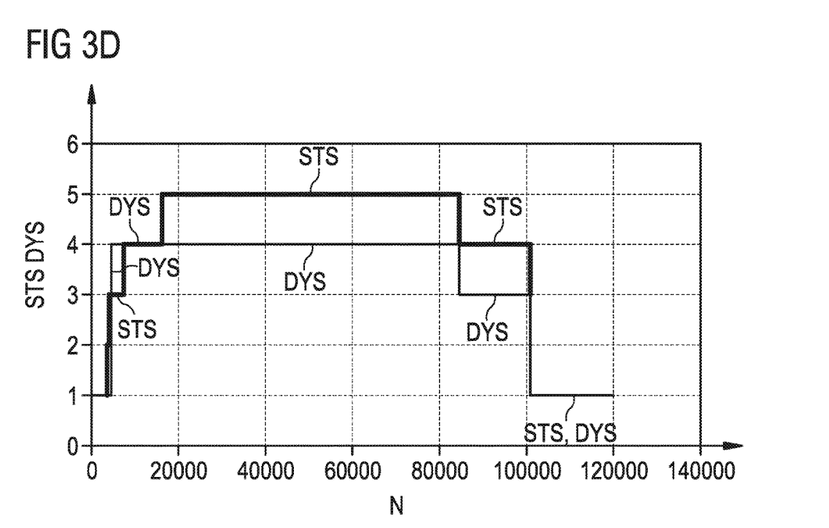

For an acceleration profile as shown in FIG. 3B, the results are elucidated in FIGS. 3C and 3D. The moving device 24 rotates with an initial speed of 10000 rpm. The moving device 24 performs an acceleration of 10 krad/s$^2$ between sample N=0 and sample N=40000. Thus, the angular speed is increased from 10000 rpm at sample N=0 to 12000 rpm at sample N=40000. The speed is kept constant after sample N=40000. As shown in FIG. 3C, the DAE of the filtered position signal FAS may obtain, for example, a value −14 at the start of the acceleration but is reduced to very low values after about 10 ms. After sample N=100000, the adaptive loop filter 16 has returned to low noise operation.

In FIG. 3D, the dynamic signal DYS and the static signal STS are shown as a function of the sample number N. As soon as the error signal reaches about 10 lsb corresponding to 1 angular degree, the time constant of the loop filter 16 is reduced according to the applied acceleration. Angular degree is abbreviated as deg. Finally, the reduction of the acceleration is detected and the time constant is increased again. The noise is increased but the DAE is drastically reduced. The line marked with STS displays the adaptive level generated by the auxiliary loop 60 and the line marked with DYS results from the error signal DF1 of the loop filter 16. The maximum of both signals STS, DYS will be applied to control the integrator 51 and the position integrator 54.

Figure 3E:
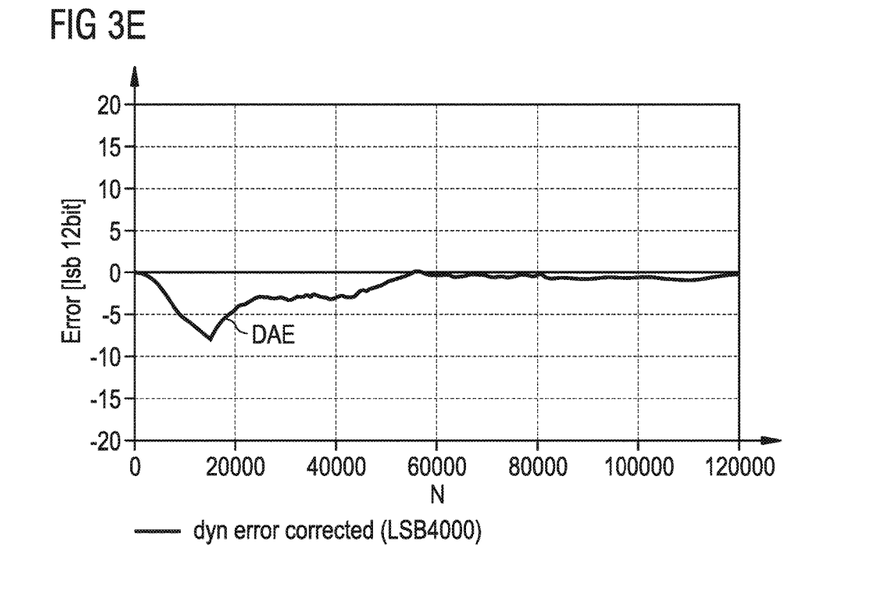
Figure 3F:
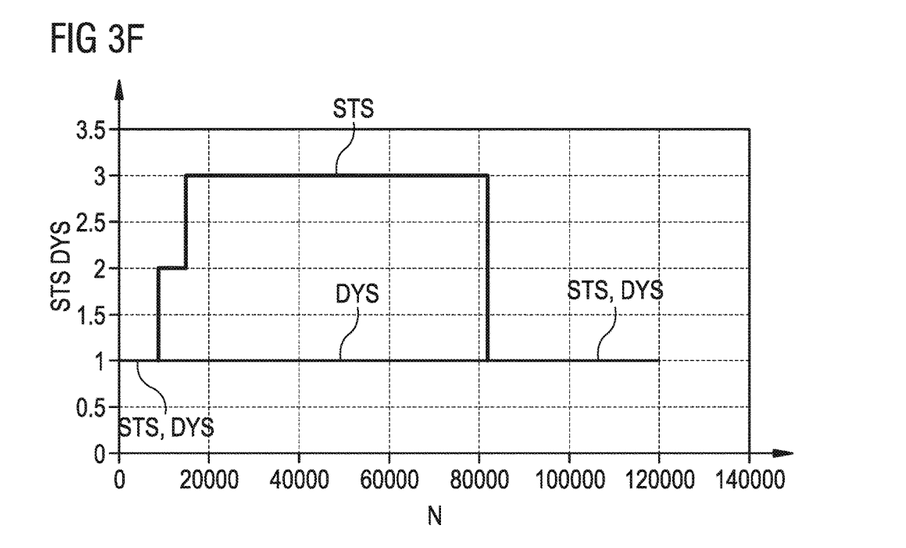

FIGS. 3E and 3F show simulation results obtained with an acceleration profile similar to the acceleration profile shown in FIG. 3B. In FIGS. 3E and 3F, a lower acceleration, namely an acceleration of 1 krad/s$^2$ between sample N=0 and the sample N=40000 is chosen. Thus, the speed increases from 10000 rpm to 10200 rpm. The error of the filtered position signal FAS as shown in FIG. 3E is lower than as shown in FIG. 3C. As elucidated in FIG. 3F, the dynamic signal DYS remains constant, whereas the static signal STS is increased after the start of the acceleration and has the effect that the error of the filtered position signal FAS is reduced.

After sample N=80000 the adaptive loop filter 16 has returned to low noise operation. A noise increase is less for smaller acceleration values. For lower acceleration values the auxiliary loop 60 that is used to generate the static signal STS is more sensitive for adaption control. Thus, the auxiliary loop 60 advantageously contributes to the determination of the time constants of the integrator 51 and the position integrator 54.

The position sensor device 10 efficiently performs a method for filtering and compensation of the dynamic angle error.

The magnetic position sensor device 10 comprises mainly an analog front-end (Hall elements 11, 12, front-end amplifier 37, 38, filter 39, 40 etc.), an analog-to-digital converter 32, 33 and a digital back-end (decimation filter, CORDIC algorithm etc.). The first and the second Hall element 11, 12 can be realized as Hall sensors. The position calculation unit 34 is designed to perform a CORDIC algorithm. CORDIC is an abbreviation for coordinate rotation digital computer. Both the analog front-end and the digital back-end introduce delay in the angle calculation. This delay is called a system propagation delay, abbreviated as SPD. Due to this latency time between the measurement of the magnetic field vector and the moment in time when the angle is available (e.g. through the SPI interface), the magnetic position sensor device 10 can introduce an angle error which is obviously proportional to the speed. At higher speed, the contribution of the DAE can be substantially large, if the SPD is not compensated.

For example considering a system propagation delay SPD=100 µs and a rotation speed of 30000 rpm the associated DAE is:

$$DAE=(30000/60)*360*100\ 10^{-6}\ \text{deg}=18\ \text{deg}$$

Without the loop filter 16 a position sensor device performs noise filtering in sine-cosine domain followed by angular calculation by means of a tracking ADC or CORDIC respectively. This gives the limitation that the noise filter bandwidth cannot be lower than the sine-cosine signal frequency Fsig at maximum rotation speed:

$$F\text{sig[Hz]}=\text{Speed[rpm]}/60$$

which results in 500 Hz for 30000 rpm. A first order filter with a corner frequency of Fc results in a delay of Tdelay=1/(2πFc) which results in 1.6 ms at 100 Hz. At a rotation speed of 30000 rpm, the associated DAE will be:

$$DAE=(30000/60)*360*1.6\ 10^{-3}\ \text{deg}=288\ \text{deg}$$

The filter method performed by the processing unit 15 as shown in FIG. 2B provides noise bandwidth limiting below the signal frequency including delay error compensation for constant speed. This may allow reducing the noise e.g. by more than a factor of 10 compared to current rotary encoders. Further, the adaptive algorithm achieves small total errors during acceleration and during operation with larger INL errors which also have an effect like acceleration.

In the position sensor device 10, filtering is realized in the angular domain instead of the sine/cosine domain. The filter block comprising the loop filter 16 is arranged within the post processing chain. In this case, the lowest filter bandwidth is not limited by the maximum rotation frequency but only by the angular acceleration.

The filter block is implemented having a closed loop controller including two integrators 51, 54. The two integrators 51, 54 make the filter able to follow an angular ramp (equivalent to constant rotation speed) with zero error. So the loop filter 16 does not add a delay related error at constant speed.

The subtraction for generating the loop difference DF1 at the input of the loop filter 16 solves the problem of a saw tooth input signal (360 deg to 0 deg step) due to inherent modulo operation. The position integrator 54 can be clocked at a higher clock rate and also serves as an interpolator for a higher resolution of the filtered position signal FAS.

The delay unit 55 is inserted in the feedback of the loop filter 16. Thus, delays generated in the analog domain that precedes the controller are compensated. No noise is added for delay compensation of the preceding delays. Very little additional area on a semiconductor body is required.

The time constants of the integrators 51, 54 are varied to adapt to different dynamic conditions such as acceleration conditions. The varying dynamic conditions can be detected very fast at the loop difference signal, optionally by the loop difference DF1. To omit noise generated from time constant switching, the auxiliary loop 60 measures the dynamic status of the digital position signal ANS. The auxiliary loop 60 itself uses a fixed time constant.

In general, a filter may be defined as a unit providing an output signal in which some unwanted components of an input signal of the filter are reduced.

The loop filter 16 may comprise a feedback mechanism. The auxiliary loop 60 may comprise a feedback mechanism.

The loop filter 16 may be implemented as adaptive loop filter. At least one parameter, filter parameter or coefficient of the loop filter 16 may be changed over time to adapt to changing signal characteristics.

We claim:

1. A position sensor device, comprising:
  a first Hall element,
  a second Hall element,
  a signal evaluation circuit operable to provide a digital position signal, wherein the signal evaluation circuit comprises:
    a position calculation unit,
    a first analog-to-digital converter (ADC) coupled between the first Hall element and a first input of the position calculation unit,
    a second ADC coupled between the second Hall element and a second input of the position calculation circuit, and
    wherein an output of the position calculation unit is connected to an output of the signal evaluation circuit, and
  a processing unit comprising a loop filter, wherein the loop filter comprises:
    a subtracting unit having a first input coupled to an input of the loop filter,
    an integrator,
    a proportional element, and
    an adder,
  wherein the input of the loop filter is coupled via an input of the processing unit to the output of the signal evaluation circuit,
  wherein a signal output of the loop filter is coupled to an output of the processing unit,
  wherein an output of the subtracting unit is coupled via the integrator to a first input of the adder,
  wherein the output of the subtracting unit is coupled via the proportional element to a second input of the adder, and wherein an output of the adder is coupled to the signal output of the loop filter, wherein the loop filter is configured such that the digital position signal is provided to the input of the loop filter and the loop filter provides a filtered position signal at the signal output of the loop filter, and wherein the processing unit is operable to adaptively control a filter parameter of the loop filter during operation.

2. The position sensor device according to claim 1, wherein the filter parameter is operable to be controlled as a function of an acceleration signal.

3. The position sensor device according to claim 1, wherein the filter parameter is a time constant of the integrator.

4. The position sensor device according to claim 1, wherein the loop filter is operable to generate the filtered position signal and a loop difference, and wherein the processing unit is operable to generate the filter parameter as a function of the loop difference.

5. The position sensor device according to claim 1, wherein the processing unit comprises an auxiliary loop that is coupled on its input side to the signal evaluation unit and is operable to provide an auxiliary loop difference, and wherein the processing unit is operable to generate the filter parameter as a function of the auxiliary loop difference.

6. The position sensor device according to claim 4, wherein the processing unit is operable to generate the filter parameter as a function of the auxiliary loop difference and of the loop difference.

7. The position sensor device according to claim 1, wherein the processing unit comprises a control unit having a finite state machine that is operable to set the filter parameter.

8. The position sensor device according to claim 1, wherein the loop filter is operable to compensate a delay of a signal chain.

9. The position sensor device according to claim 1, wherein the loop filter comprises a delay unit coupling the signal output to a second input of the subtracting unit.

10. The position sensor device according to claim 9, wherein the subtracting unit is operable to perform a modulo operation.

11. The position sensor device according to claim 9, wherein the loop filter comprises a position integrator that is coupled between an output of the adder and the signal output.

12. The position sensor device according to claim 11, wherein the adder is connected on its output side to the position integrator.

13. The position sensor device according to claim 11, wherein the processing unit is operable to adaptively control a time constant of the position integrator during operation.

14. The position sensor device according to claim 11, wherein a clock rate of the position integrator is higher than a clock rate of the integrator.

15. A method for providing a filtered position signal, comprising:
generating at least two analog sensor signals by at least two Hall elements,
generating, by a signal evaluation circuit, a digital position signal as a function of the at least two analog sensor signals, wherein generating the digital position signal comprises:
converting, by a first analog-to-digital converter (ADC) of the signal evaluation circuit, a first analog sensor signal of the least two analog sensor signals to a first digital signal,
converting, by a second ADC of the signal evaluation circuit, a second analog sensor signal of the least two analog sensor signals to a second digital signal,
generating, by a position calculating unit of the signal evaluation circuit, the digital position signal based on the first digital signal and the second digital signal, and
generating a filtered position signal by a loop filter, wherein generating the filtered position signal comprises:
generating a loop difference signal based on the digital position signal,
generating a first intermediate signal by integrating the loop difference signal,
generating a second intermediate signal by amplifying the loop difference signal,
generating the sum of the first intermediate signal and the second intermediate signal, and
generating the filtered position signal based on the sum of the first intermediate signal and the second intermediate signal, and
adaptively controlling a filter parameter of the loop filter during operation.

16. A position sensor device, comprising:
a Hall element,
a second Hall element,
a signal evaluation circuit that is operable to provide a digital position signal, wherein the signal evaluation circuit comprises:
a position calculation unit,
a first analog-to-digital converter (ADC) coupled between the first Hall element and a first input of the position calculation unit,
a second ADC coupled between the second Hall element and a second input of the position calculation unit,
wherein an output of the position calculation unit is connected to an output of the signal evaluation unit,
a processing unit comprising a loop filter, wherein the processing unit is operable to adaptively control a filter parameter of the loop filter during operation,
wherein the loop filter comprises:
a subtracting unit having a first input coupled to the output of the signal evaluation circuit,
an integrator coupled to an output of the subtracting unit, a signal output being coupled to an output of the integrator, and
a delay unit coupling the signal output to a second input of the subtracting unit.

17. A position sensor device, comprising:
a first Hall element,
a second Hall element,
a signal evaluation circuit that is operable to provide a digital position signal and
a processing unit comprising a loop filter, wherein an input of the loop filter is coupled via an input of the processing unit to an output of the signal evaluation circuit and a signal output of the loop filter is coupled to an output of the processing unit, and wherein the signal evaluation circuit comprises:
a first amplification and filter circuit,
a second amplification and filter circuit, and
a position calculation unit, wherein the first amplification and filter circuit is coupled between the first Hall element and a first input of the position calculation unit,
wherein the second amplification and filter circuit is coupled between the second Hall element and a second input of the position calculation unit, and
wherein an output of the position calculation unit is connected to the output of the signal evaluation circuit,
wherein the loop filter is configured such that the digital position signal is provided to the input of the loop filter and the loop filter provides a filtered position signal at the signal output of the loop filter, wherein the loop filter comprises:
a subtracting unit having a first input coupled to the input of the loop filter,
an integrator,
a proportional element, and
an adder,
wherein an output of the subtracting unit is coupled via the integrator to a first input of the adder,
wherein the output of the subtracting unit is coupled via the proportional element to a second input of the adder, and
wherein an output of the adder is coupled to the signal output of the loop filter, and
wherein the processing unit is operable to adaptively control a filter parameter of the loop filter during operation.

18. A position sensor device, comprising:
a first Hall element,
a second Hall element
a signal evaluation circuit that is operable to provide a digital position signal, wherein the signal evaluation circuit comprises:
a first amplification and filter circuit,
a second amplification and filter circuit, and
a position calculation unit,
wherein the first amplification and filter circuit is coupled between the first Hall element and a first input of the position calculation unit,
wherein the second amplification and filter circuit is coupled between the second Hall element and a second input of the position calculation unit, and
wherein an output of the position calculation unit is connected to an output of the signal evaluation circuit, and
a processing unit comprising a loop filter that, wherein the processing unit is operable to adaptively control a filter parameter of the loop filter during operation,
wherein the loop filter comprises:
a subtracting unit having a first input coupled to the output of the signal evaluation circuit,
an integrator coupled to an output of the subtracting unit, the signal output being coupled to an output of the integrator, and
a delay unit coupling the signal output to a second input of the subtracting unit.

* * * * *

UNITED STATES PATENT AND TRADEMARK OFFICE
CERTIFICATE OF CORRECTION

PATENT NO. : 10,429,208 B2  
APPLICATION NO. : 15/406614  
DATED : October 1, 2019  
INVENTOR(S) : Kurt Riedmueller et al.

Page 1 of 1

It is certified that error appears in the above-identified patent and that said Letters Patent is hereby corrected as shown below:

In the Claims

<u>Column 14</u>
Claim 1, delete "circuit," and insert -- unit, --.

<u>Column 16</u>
Claim 16, Line 29, delete "a Hall element" and insert -- a first Hall element --.
Claim 17, Line 58, delete "digital position signal and" and insert -- digital position signal, and --.

<u>Column 18</u>
Claim 18, Line 3, delete "a second Hall element" and insert -- a second Hall element, --.
Claim 18, Line 18, delete "a processing unit comprising a loop filter that, wherein the" and insert -- a processing unit comprising a loop filter, wherein the --.

Signed and Sealed this  
Seventh Day of January, 2020

Andrei Iancu  
*Director of the United States Patent and Trademark Office*